(12) United States Patent
Agarwal et al.

(10) Patent No.: US 12,155,573 B2
(45) Date of Patent: Nov. 26, 2024

(54) RATE LIMITED SCHEDULER FOR SOLICITED DATA TRANSFERS

(71) Applicant: Google LLC, Mountain View, CA (US)

(72) Inventors: Abhishek Agarwal, San Jose, CA (US); Ye Tang, Palo Alto, CA (US); Sean Clark, Sunnyvale, CA (US); Sarin Thomas, Sunnyvale, CA (US); Hugh McEvoy Walsh, Los Gatos, CA (US); Xiyu Wang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 294 days.

(21) Appl. No.: 17/713,700

(22) Filed: Apr. 5, 2022

(65) Prior Publication Data
US 2023/0318976 A1    Oct. 5, 2023

(51) Int. Cl.
*H04L 47/12* (2022.01)
(52) U.S. Cl.
CPC .................................. *H04L 47/12* (2013.01)
(58) Field of Classification Search
CPC ......... H04L 47/12; H04L 47/20; H04L 47/22; H04L 47/39; H04L 47/50; H04L 47/622; H04L 47/26; H04L 47/267; H04L 49/50; H04W 74/08
See application file for complete search history.

(56) References Cited

U.S. PATENT DOCUMENTS

| | | | |
|---|---|---|---|
| 9,426,083 B2 * | 8/2016 | Ziegler | ................. H04L 49/555 |
| 2005/0094558 A1 | 5/2005 | Lu | |
| 2006/0099990 A1 * | 5/2006 | Chau | ..................... H04W 74/06 370/346 |
| 2006/0114912 A1 * | 6/2006 | Kwan | ..................... H04L 47/10 370/395.4 |
| 2016/0261513 A1 * | 9/2016 | Aingaran | ................. H04L 47/39 |
| 2020/0084150 A1 | 3/2020 | Burstein et al. | |

FOREIGN PATENT DOCUMENTS

| | | | | |
|---|---|---|---|---|
| CN | 105281864 A | * | 1/2016 | ............ H04W 74/08 |
| CN | 110121177 A | * | 8/2019 | ............ H04W 16/14 |

OTHER PUBLICATIONS

Gibson et al. Aquila: A unified, low-latency fabric for datacenter networks. Usenix, the Advanced Computing Systems Association, Apr. 1, 2022 (Apr. 1, 2022), pp. 1258-1275, Retrieved from the Internet: <https://www.usenix.org/sites/default/files/nsdi22_full-proceedings-interior.pdf>.
Extended European Search Report for European Patent Application No. 22207523.6 dated Jul. 6, 2023. 11 pages.

* cited by examiner

*Primary Examiner* — Mohamed A Kamara
(74) *Attorney, Agent, or Firm* — Lerner David LLP

(57) ABSTRACT

A flow rate control method for solicited data communications includes receiving, at a first node of a communications network, a request-to-send (RTS) signal from a second node of the communications network, the RTS signal indicating a size of a solicited data transmission of the second node, determining, by the first node, whether a rate-limiting counter is above zero, wherein the rate-limiting counter is programmed to increase at a programmed rate and in response to the rate-limiting counter being above zero, scheduling, by the first node, a clear-to-send (CTS) signal to be sent from the first node to the second node over the communications network, and subtracting, by the first node, a value corresponding to the size of the solicited data transmission of the second node from the rate-limiting counter.

20 Claims, 7 Drawing Sheets

RATE LIMITED SCHEDULER FOR SOLICITED DATA TRANSFERS

BACKGROUND

Data transfers between sending and receiving nodes of a network are susceptible to incast congestion at the receiving node when a data transmission rate of the sending node exceeds the rate at which the receiving node can process the data. One way of avoiding incast congestion is for the sending node to solicit the receiving node before initiating the data transfer. Solicitation may involve the sending node transmitting request-to-send (RTS) signals to the receiving node. In response to receiving the RTS signals, the receiving node may send back clear-to-send (CTS) signals to the sending node, indicating that there is ingress bandwidth available for the data transfer. In the event that there is incast congestion at the receiving node, processing the RTS signals sent from the sending node is delayed due to the congestion, meaning that the CTS signals are not immediately sent back. In this manner, the RTS/CTS handshake avoids further congestion building up at the receiving node.

While RTS/CTS solicitation can avoid incast congestion in a one-to-one endpoint scenario, many-to-one endpoint scenarios are still susceptible. For example, multiple sending nodes may send RTS signals to the receiving node at different times. Because the receiving node receives the RTS signals at different times, the receiving node may send back CTS signals to each of the multiple sending nodes, indicating that the receiving node is clear to receive data packets from all of the sending nodes. Then, if the sending nodes all send their data packets at the same time to the receiving node, the incoming packets can result in congestion.

BRIEF SUMMARY

The present disclosure prevents incast congestion from occurring in many-to-one endpoint scenarios by providing a rate limited scheduler at the receiving node. Sending the CTS signals may be rate limited by the rate limiter to prevent too many CTS signals from being sent to multiple transmitting nodes within a given span of time.

One aspect of the disclosure is directed to a method including: receiving, at a first node of a communications network, a request-to-send (RTS) signal from a second node of the communications network, the RTS signal indicating a size of a solicited data transmission of the second node; determining, by the first node, whether a rate-limiting counter is above zero, wherein the rate-limiting counter is programmed to increase at a programmed rate; and in response to the rate-limiting counter being above zero: scheduling, by the first node, a clear-to-send (CTS) signal to be sent from the first node to the second node over the communications network; and subtracting, by the first node, a value corresponding to the size of the solicited data transmission of the second node from the rate-limiting counter.

In some examples, the method may further include: transmitting, by the first node, the CTS signal to the second node in response to the scheduling; and receiving, by the first node, the solicited data transmission from the second node, wherein the size of the solicited data transmission is greater than a size of the RTS signal.

In some examples, the rate limiting counter may be programmed to increase at the programmed rate until a predetermined maximum value.

In some examples, the method may further include: receiving, at the first node, a request-to-send (RTS) signal from a third node of the communications network, the RTS signal indicating the size of the solicited data transmission of the third node; determining, by the first node, whether the rate-limiting counter is above zero; and in response to the rate-limiting counter being above zero: scheduling, by the first node, another CTS signal to be sent from the first node to the third node over the communications network; and subtracting, by the first node, a value corresponding to the size of the solicited data transmission of the third node from the rate-limiting counter.

In some examples, the size of the solicited data transmission of the second node may be different from the size of the solicited data transmission of the third node.

In some examples, the method may further include: determining, by the first node, at least one of (i) a port of the first node associated with the solicited data transmission, or (ii) a Class of Service (CoS) of the associated with the solicited data transmission; selecting, by the first node, a destination queue for the received RTS signal from among a plurality of queues based on the determined port and CoS; and sending, by the first node, the received RTS signal to the destination queue.

In some examples, the rate-limiting counter may be associated with a selector of the first node associated with two or more of the plurality of queues including the destination queue. The method may further include selecting, by the selector, the RTS signal from the destination queue. Scheduling the CTS signal to be sent from the first node to the second node and subtracting the value corresponding to the size of the solicited data transmission of the second node from the rate-limiting counter may be performed in response to selection of the RTS signal from the destination queue.

In some examples, each of the two or more queues may be associated with a respective weighting. The method may further include: initializing, by the first node, a respective credit counter of each of the two or more queues according to the respective weightings of the queues, wherein a greater weight corresponds to a larger initial credit counter value; subtracting, by the first node, credits from the respective credit counters of the two or more queues in a round robin fashion that skips credit counters having fewer than zero credits; and selecting the received RTS signal from the destination queue in response to credits being subtracted from the respective credit counter of the destination queue.

In some examples, the method may further include, in response to every one of the two or more queues having fewer than zero credits, reinitializing, by the first node, the respective credit counters of the two or more queues according to the respective weightings of the queues.

In some examples, for each given queue, the respective weighting of the given queue may correspond to at least one of (i) a bandwidth of the port associated with the given queue, or (ii) a priority level of the CoS associated with the given queue.

Another aspect of the present disclosure is directed to a system including one or more processors and memory in communication with the one or more processors. The memory may contain instructions configured to cause the one or more processors to: receive an RTS signal from a second node of the communications network, the RTS signal indicating a size of a solicited data transmission of the second node; determine whether a rate-limiting counter is above zero, wherein the rate-limiting counter is programmed to increase at a programmed rate; and in response to the rate-limiting counter being above zero: schedule a CTS signal to be sent from the first node to the second node over the communications network; and subtract a value corresponding to the size of the solicited data transmission of the second node from the rate-limiting counter.

In some examples, the instructions may be configured to cause the one or more processors to: transmit the CTS signal to the second node in response to the scheduling; and receive the solicited data transmission from the second node, wherein the size of the solicited data transmission is greater than a size of the RTS signal.

In some examples, the rate limiting counter may be programmed to increase at the programmed rate until a predetermined maximum value.

In some examples, the instructions may be further configured to cause the one or more processors to: receive an RTS signal from a third node of the communications network, the RTS signal indicating the size of the solicited data transmission of the third node; determine whether the rate-limiting counter is above zero; and in response to the rate-limiting counter being above zero: schedule another CTS signal to be sent from the first node to the third node over the communications network; and subtract a value corresponding to the size of the solicited data transmission of the third node from the rate-limiting counter.

In some examples, the size of the solicited data transmission of the second node may be different from the size of the solicited data transmission of the third node.

In some examples, the instructions may be configured to determine at least one of (i) a port of the first node associated with the solicited data transmission, or (ii) a CoS of the associated with the solicited data transmission; select a destination queue for the received RTS signal from among a plurality of queues based on the determined port and CoS; and send the received RTS signal to the destination queue.

In some examples, the rate-limiting counter may be associated with a selector of the first node associated with two or more of the plurality of queues including the destination queue. The instructions may be configured to cause the one or more processors to select the RTS signal from the destination queue, and schedule the CTS signal to be sent from the first node to the second node and subtract the value corresponding to the size of the solicited data transmission of the second node from the rate-limiting counter in response to selection of the RTS signal from the destination queue.

In some examples, each of the two or more queues may be associated with a respective weighting. The instructions may be configured to cause the one or more processors to: initialize a respective credit counter of each of the two or more queues according to the respective weightings of the queues, wherein a greater weight corresponds to a larger initial credit counter value; subtract credits from the respective credit counters of the two or more queues in a round robin fashion that skips credit counters having fewer than zero credits; and select the received RTS signal from the destination queue in response to credits being subtracted from the respective credit counter of the destination queue.

In some examples, the instructions may be configured to cause the one or more processors to, in response to every one of the two or more queues having fewer than zero credits, reinitialize the respective credit counters of the two or more queues according to the respective weightings of the queues.

In some examples, for each given queue, the respective weighting of the given queue may correspond to at least one of (i) a bandwidth of the port associated with the given queue, or (ii) a priority level of the CoS associated with the given queue.

DETAILED DESCRIPTION

Overview

The present disclosure prevents incast congestion from occurring in many-to-one endpoint scenarios by providing a rate limited scheduler at the receiving node. The scheduler may schedule the CTS signals to be sent to the sending nodes without immediately sending the CTS signals. Sending the CTS signals may be rate limited to prevent the CTS signals from being sent unless a counter indicates that there is available incast bandwidth for incoming data packets. This may be accomplished using a token bucket scheme. For instance, the counter may begin at zero and increase at a programmed rate. Then, when a CTS is scheduled by the solicitation scheduler, the amount of solicited data may be subtracted from the counter. CTS scheduling may occur provided that the rate counter is above zero, and may otherwise wait to occur until the counter increases to above zero. The counter may further have a programmed maximum value corresponding to a maximum incast bandwidth that the receiving node can service in a burst.

The rate limiter may be applied to a selector within the scheduler. One example selector is a port selector, which selects to pass RTS messages received at one of a plurality of ports of the receiving node according to predefined parameters. Another example selector is a Class of Service (CoS) selector, which selects RTS messages associated with different CoS levels according to predefined parameters. The scheduler may include any one or combination of one or more port selectors and one or more CoS selectors, whereby one or more rate limiters may be applied to any one or combination of selectors in order to provide CTS signal transmission rate limiting.

The predefined parameters may be a weighted round robin (WRR) basis, whereby different ports or CoS levels are attributed with respective weights that define the frequency with which they are selected by the selector. In the case of a port selector, the weightings may be chosen according to the relative bandwidths of each port. In the case of a CoS selector, the weightings may be chosen according to a relative priority of each CoS level. Weightings may be implemented as respective credit counters initialized to respective programmed weights, such that a given port or CoS may be selected by the selector so long as its counter has enough credits remaining. Counters may reinitialize when all counters are zero or negative.

In operation, the rate limited scheduler avoids incast congestion by preventing CTS signals from being transmitted too quickly when RTS signals corresponding to a large amount of data are received from several sources. The overall reduction in congestion events has the effect of reducing tail latency for the network, meaning less disruption and higher satisfaction for network users.

Example Systems

Figure 1:
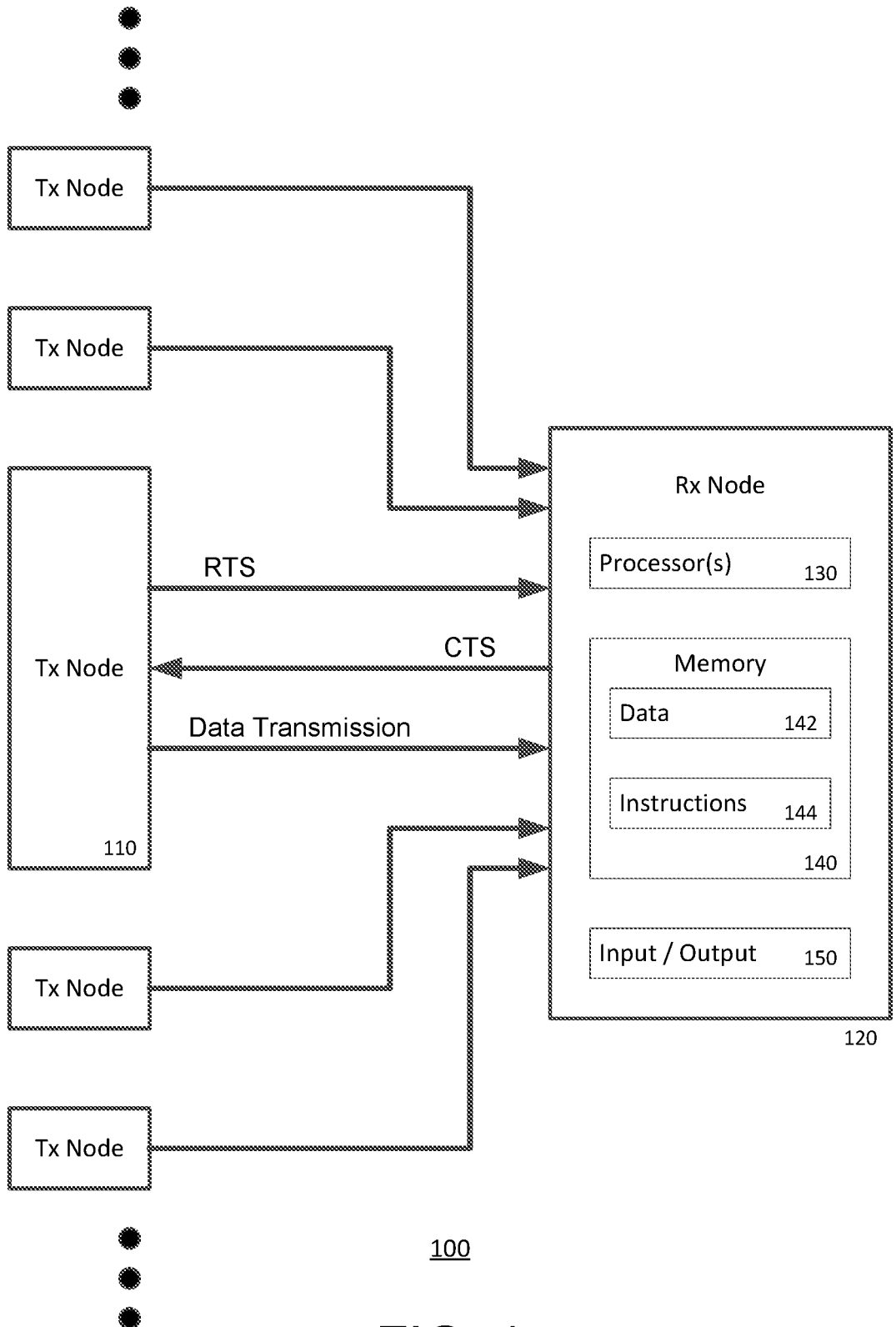
FIG. 1 is a block diagram of an example system in accordance with an aspect of the present disclosure.

FIG. 1 illustrates an example system 100 for rate-limited RTS/CTS exchange. The system includes at least a plurality of nodes configured to communicate data between one another. In the example of FIG. 1, the system 100 is shown as including a plurality of transmitting nodes 110 for transmitting the communicated data and at least one receiving node 120 for receiving the data. The receiving node 120 may be capable of receiving data from multiple transmitting nodes 110, making the data transmission scenario of the system 100 a one-to-many scenario.

Data transmission may include a flow control mechanism, such as RTS/CTS, in order to ensure sufficient bandwidth at the receiving node 120 for receiving the data transmitted by each of the transmitting nodes 110. In operation, the flow control mechanism may begin with the transmitting node 110 sending a request to send (RTS) signal to the receiving node. The RTS signal may indicate that the transmitting node 110 is requesting to send a data communication to the receiving node, and may further include some information about the data communication. For instance, the RTS signal may indicate the size of the data communication. In some instances, the RTS signal may further indicate a type of the data communication, such as through a Class of Service (CoS) indication. The RTS signal may be smaller in the size than the requested data communication. In response to receiving the RTS signal, the receiving node 120 may send back a clear-to-send (CTS) signal to the transmitting node 110, indicating that there is sufficient bandwidth at the receiving node 120 to receive the data communication. Then, in response to the CTS signal, the transmitting node 110 may transit the data communication to the receiving node 120.

Although the receiving node 120 is in communication with each of multiple transmitting nodes, the transmitting nodes are not necessarily in communication with one another and, therefore, do not coordinate data transmissions between one another. Therefore, the receiving node 120 includes a subsystem for handling the flow control mechanism in a fashion that avoids too many data communications being sent to the receiving node 120 from different transmitting nodes at the same time or within too short of a duration for the available bandwidth of the receiving node 120 to handle all of the communications.

Components of the receiving node flow control subsystem may include a processor 130, memory 140 and communication devices 150 for receiving inputs and transmitting outputs.

The processor 130 can be a well-known processor or other lesser-known types of processors. Alternatively, the processor 130 can be a dedicated controller such as an ASIC.

The memory 140 may be a type of non-transitory computer readable medium capable of storing information accessible by the processor 110, such as a hard-drive, solid state drive, tape drive, optical storage, memory card, ROM, RAM, DVD, CD-ROM, write-capable, and read-only memories. The memory 140 can store information accessible by the processor 130, including data that can be retrieved, manipulated or stored by the processor 130. The memory 140 can also include instructions that can be executed by the processor 130. In the example system 100 of FIG. 1, the memory 140 is shown to include data 142 and instructions 144 for executing one or more routines of the flow control mechanism. Examples of the data and instructions are described in the various embodiments presented herein.

The communication devices 150 may be capable of direct and indirect communication with one another, with client devices, or any combination thereof, over a network. The network, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Figure 2:
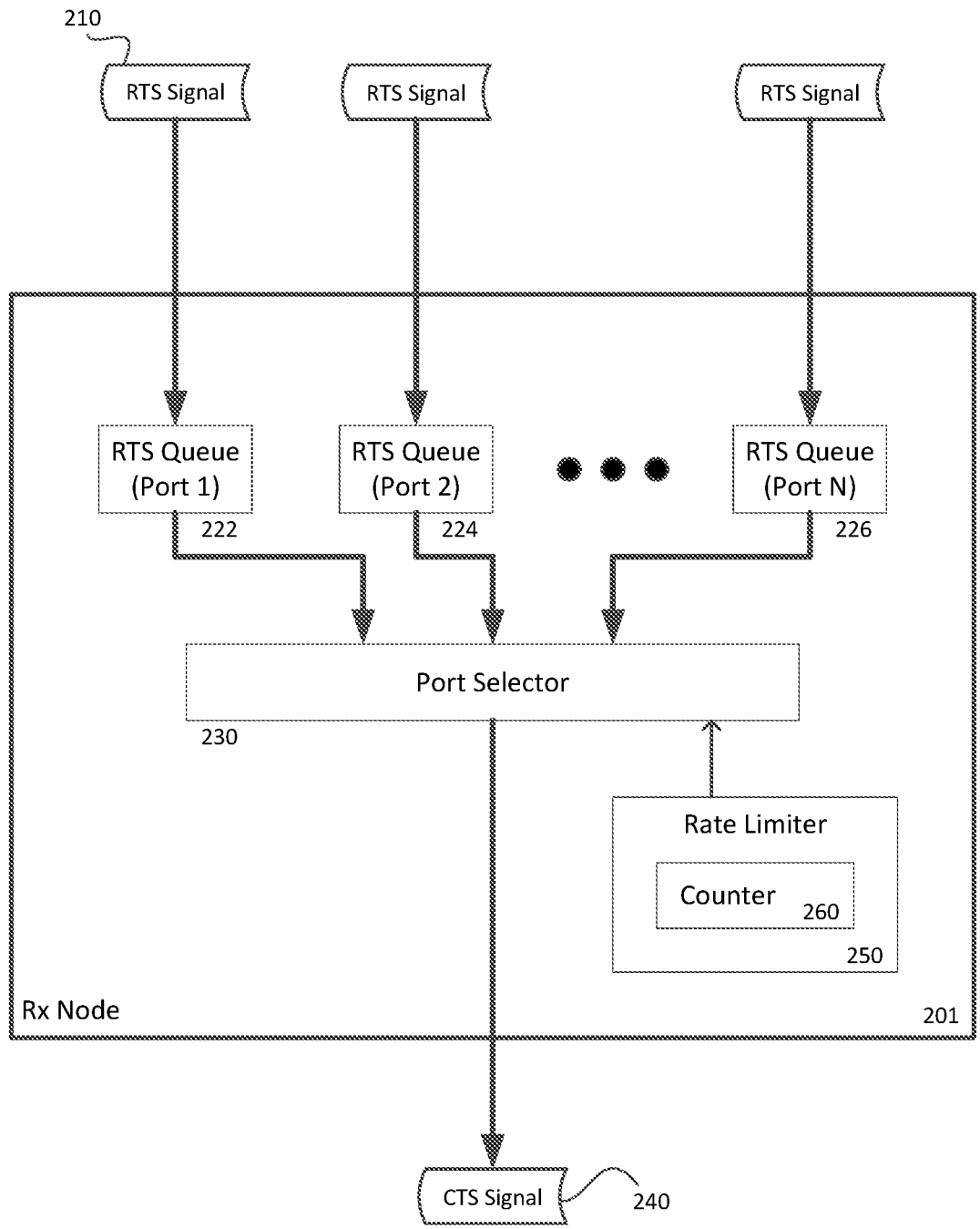
FIGS. 2-4 are block diagrams of example data flow control subsystems in accordance with aspects of the present disclosure.
Figure 3:
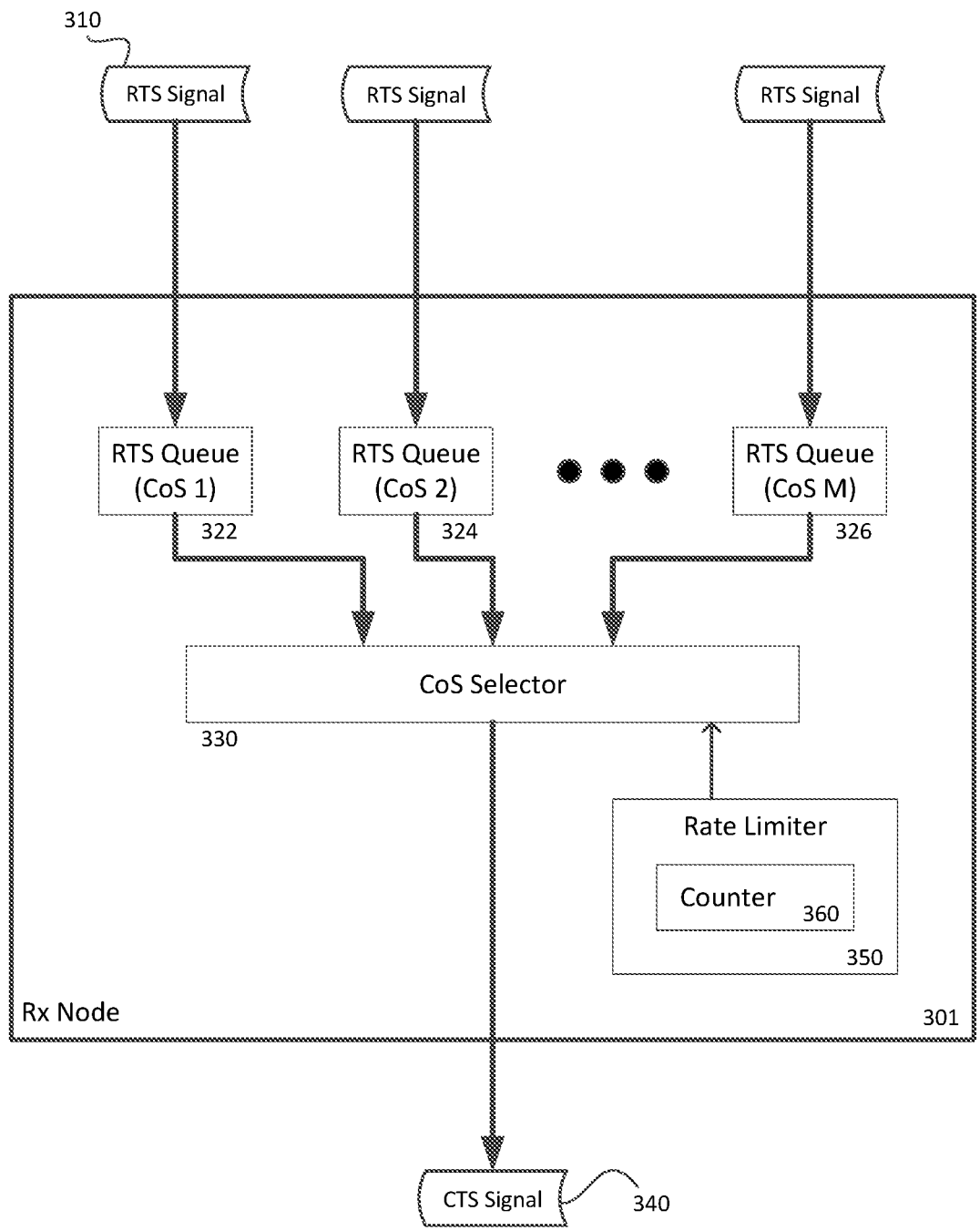
Figure 4:
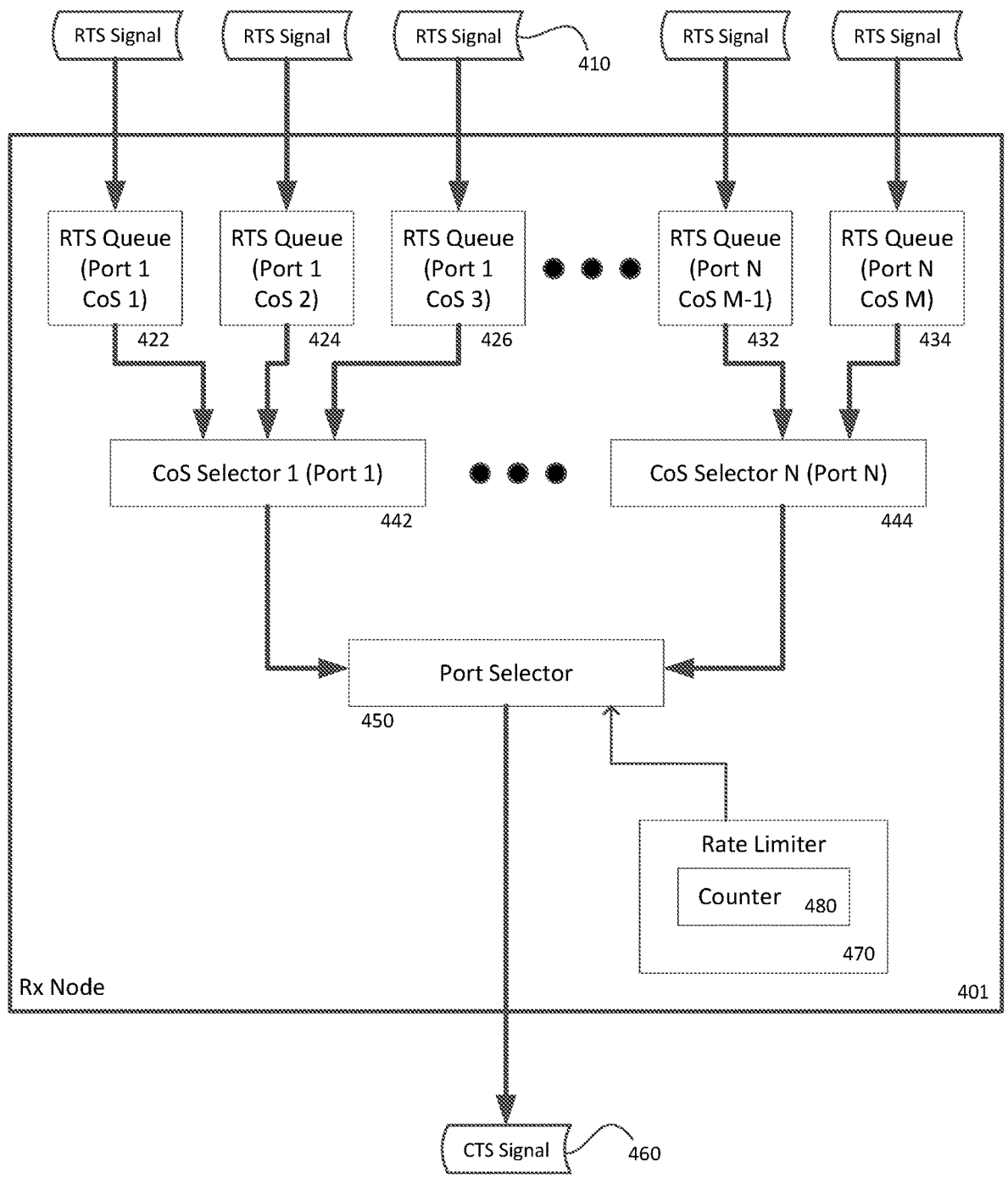

Each of FIGS. 2-4 is a block diagram illustrating an example processing flow of data through a receiving node. In each of the examples, received RTS signals are queued as they are received and processed according to rules of the queuing process. Selection and processing of the RTS signals is further slowed using a rate limiter in order to slow a rate at which CTS signals are returned to the transmitting nodes from which the RTS signals were received. The rate of CTS signal return may be based on the anticipated size of the requested data transmissions from the transmitting nodes, which may be determined from data in the received RTS signals.

In the example of FIG. 2, received RTS signals 210 are queued according to the respective ports of the receiving node 201 at which they are received. As shown in FIG. 2, the receiving node may include N ports, and each port may be associated with its own respective queue. That is, RTS signals received at a first port of the receiving node 201 may be queued at a first RTS queue 222, RTS signals received at a second port of the receiving node 201 may be queued at a second RTS queue 224, and so on up to RTS signals received at an nth port of the receiving node being queued at an nth RTS queue 226.

A port selector 230 is configured to select an RTS signal from one of the RTS queues 222, 224, 226. The queues 222, 224, 226 may be selected from in a round-robin fashion, whereby the port selector cycles through the queues in a predetermined order. In some examples, the round-robin selection by the port selector may be weighted, such that some queues are selected more often than other queues. The weighting of the queues may be predetermined, and may correspond to the relative bandwidths of each of the ports, whereby a port with a relatively larger bandwidth may be weighted so as to be selected more often than a port having a relatively smaller bandwidth. An example routine for weighted round-robin (WRR) selection is described in greater detail herein in connection with FIG. 7.

In response to the selected RTS signal 210 from one of the queues 222, 224, 226, the port selector 230 may be configured to return a CTS signal 240 to the transmitting node from which the selected RTS signal 210 was received. In order to rate limit operations of the port selector 230, returning the CTS signal 240 may be preconditioned according to a rate limiter 250 in communication with the port selector. The rate limiter 250 may include a counter 260 programmed to have an initial value and increase from the initial value at a predetermined rate. The counter 260 may also be programmed to decrease in response to processed RTS signals. In this manner, returning the CTS signal 250 to the transmitting node may be preconditioned on a value of the counter 260 meeting or exceeding a predetermined threshold. If the counter does not meet the threshold, then flow control operations at the receiving node 201 may be paused until the counter increases to meet the threshold. An example routine for rate limiting CTS signals according to a counter is described in greater detail herein in connection with FIG. 5.

In some examples, the counter 260 may also be programmed to have a maximum value, whereby the counter 260 does not increase past the maximum value and stays constant if the maximum value is reached. The maximum value may correspond to a data communication bandwidth that could be serviced by the receiving node 201 in the case of a burst.

The example receiving node 301 of FIG. 3 is similar to the receiving node 201 of FIG. 2, except that received RTS signals 310 are queued according to their respective Class of Service (CoS). Determining the CoS of a data communication associated with a received RTS signal 310 may involve the receiving node 301 reading at least a portion of the data included in the received RTS signal 310. As shown in FIG. 3, the data communication associated with the received RTS signal may be associated with M different CoS types, and each CoS may be associated with its own respective queue. That is, RTS signals associated with a first CoS may be queued at a first RTS queue 322, RTS signals associated with a second CoS may be queued at a second RTS queue 324, and so on up to RTS signals associated with an nth CoS being queued at an nth RTS queue 326.

The receiving node 301 may include a CoS selector 330. The CoS selector 330 may be configured to select an RTS signal from one of the RTS queues 322, 324, 326 in a round-robin fashion, whereby the CoS selector 330 cycles through the queues in a predetermined order. In some examples, the round-robin selection by the CoS selector 330 may be weighted, such that some queues are selected more often than other queues. The weighting of the queues may be predetermined, and may correspond to the relative classes of service of the different requested data transmissions, whereby a CoS with a relative higher priority may be weighted so as to be selected more often than a CoS having a relatively lower priority.

As with the port selector 230 of FIG. 2, the CoS selector of FIG. 3 may be configured to return a CTS signal 340 to the transmitting node from which the selected RTS signal 310 was received, and operations of the CoS selector 330, such as returning the CTS signal 340 may be rate limited according to a rate limiter 350 in communication with the CoS selector 330. Operations of the rate limiter 350 of FIG. 3 may be comparable to the operations of the rate limiter 250 described in connection with FIG. 2. In this manner, a counter 360 included in the rate limiter 350 may establish a preconditioned threshold at which the receiving node 301 may return the CTS signal 340.

The example receiving node 401 of FIG. 4 includes both the port-based queuing functions shown in FIG. 2 and the CoS-based queuing functions shown in FIG. 3. This is accomplished by nesting both port and CoS selectors in the node and selecting from the queues of RTS signals according to the operations of the nest port and CoS selectors.

In the example of FIG. 4, received RTS signals 410 are queued according to the respective ports of the receiving node 401 at which they are received. As shown in FIG. 4, the receiving node may include N ports and the data communication associated with the received RTS signal may be associated with M different CoS types. As such, up to M*N queues may be provided, whereby each queue is associated with a different combination of port and CoS. That is, RTS signals that are received at a first port of the receiving node 401 and are associated with a first CoS may be queued at a first RTS queue 422, RTS signals that are received at the first port of the receiving node 401 and are associated with a second CoS may be queued at a second RTS queue 424, RTS signals that are received at the first port of the receiving node 401 and are associated with a third CoS may be queued at a third RTS queue 426, and so on up to RTS signals that are received at an nth port of the receiving node and are associated with an (m-1)th CoS may be queued at an ((M*N)-1)th RTS queue 432 and RTS signals that are received at the nth port of the receiving node and are associated with an mth CoS may be queued at an (M*N)th RTS queue 434.

A plurality of N CoS selectors 442, 444 may be provided for selecting RTS signals from the M*N queues. Each CoS selector may be configured to select from a different respective group of queues, whereby each CoS selector is associated with a respective port and selects from those queues having RTS signals associated with the same CoS. For instance, in FIG. 4, a first CoS selector 442 selects from all queues 422, 424, 426 that receive RTS signals 410 at the first port, up to an mth CoS selector 444 that selects from all queues 432, 434 that receive RTS signals 410 from the nth port. After each of the N CoS selectors 442, 444 selects an RTS signal for each respective port, a port selector 450 may be provided for selecting from among the CoS-selected RTS signals. In effect, the port selector selects an RTS signal from one of the N ports of the receiving node 401. A CTS signal 460 may be returned to the transmitting node from which the RTS signal selected by the port selector 450 was received.

Both the CoS selectors 442, 444 and the port selector 450 may be configured to perform selection in a round-robin fashion, whereby each CoS selector 442, 444 cycles through its respective associated queues in a predetermined order, and the port selector 450 cycles through the CoS selectors in another predetermined order. In some examples, one or more of the round-robin selections by the CoS selectors 442, 444 and the port selector 450 may be weighted. The weightings for port and CoS selection may be arranged as described in connection with FIGS. 2 and 3, respectively, whereby ports with greater bandwidths are weighted more heavily than ports with lesser bandwidths and certain data types are weighted more heavily than other data types, such as based on a priority level of the data types.

The port selector 450 may be rate limited using a rate limiter 470 having a counter 480. Operations of the rate limiter 470 and counter 480 may be comparable to those of the rate limiters and counters described in connection with FIGS. 2 and 3. In effect, the counter 480 may prevent the port selector from sending too many CTS signals back to transmitting nodes in too small of a time frame for the limited bandwidth of the receiving node 401 to handle.

In the example of FIG. 4, the CoS selectors are port selector are show nested in a configuration that positions the CoS selectors 442, 444 in a first layer followed by the port selector 450 in a second layer. However, in other examples, the order of the CoS and port selector layers may be reversed, whereby M port selectors may be provided, one for each CoS, and then an RTS signal may be selected by a single CoS selector from the RTS signals that were selected by the M port selectors.

Additionally, in the example of FIG. 4, a single rate limiter 470 is shown. The single rate limiter 470 controls the bottom selector layer of the flow control subsystem of the receiving node 401. However, in other examples, the rate limiter may be positioned at a different selector of the flow control subsystem, such as a respective rate limiter at each of the top layer selectors. Since the rate limiters would prevent their respective selectors from making a selection when the counter is too low, this could have the effect of slowing the bottom layer selector if the bottom layer selector is programmed to wait for each top layer selector to make a selection. Additionally or alternatively, rate limiters may be provided for every selector included in the flow control subsystem. In such a case, the rate limiter of the bottom layer selector may operate as described above in connection with FIGS. 2-4, while the rate limiters of the top layer selectors may prevent selections from being made before the bottom layer selector makes a selection. This, in effect, would provide a technique of weighting the top layer selectors, since the bottom layer selector would be forced to skip those top layer selectors that do not make a selection.

Also, in each of the examples of FIGS. 2-4, each port and each CoS is shown as having its own dedicated queue. However, in other example configurations, multiple ports, multiple CoS data types, or both may share a common queue, whereby a given selector may choose from multiple groups of ports or multiple groups of CoS data types. For instance, in a 16-port configuration, ports 1-8 may be fed to a first queue and ports 9-16 to a second queue, and a port selector may be used to selected between the first and second queues. The same or similar arrangement may be provided for CoS. cl Example Methods The routines executed by the flow control subsystem of a receiving node as described herein, as well as other routines, are described in greater detail in connection with the diagrams of FIGS. 5-7. It should be understood that the routines described herein are merely examples, and in other examples, certain steps may be added, subtracted, replaced or reordered.

Figure 5:
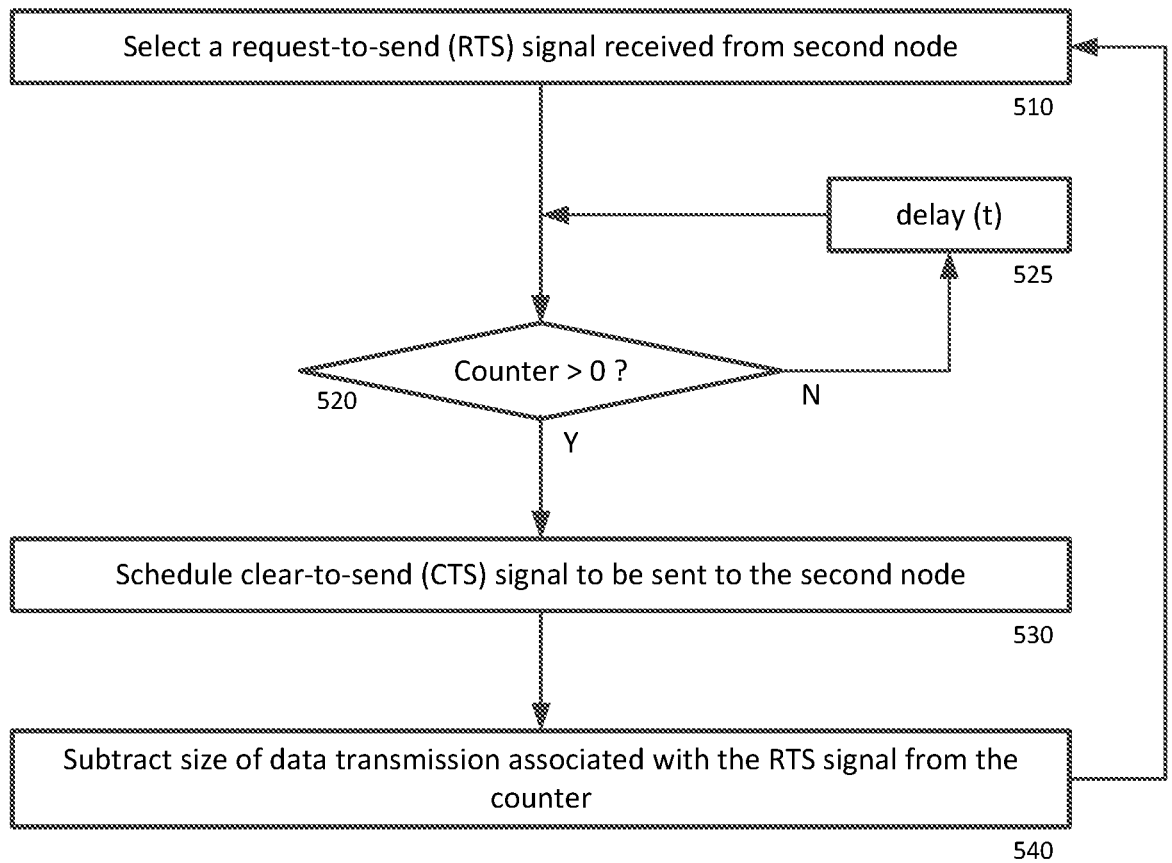
FIG. 5 is a flow diagram of an example data flow control routine according to an aspect of the present disclosure.

FIG. 5 is a flow diagram illustrating an example routine 500 for rate limited CTS signal generation by a first node for sending data flow control between the first node and a second node. The first node may be a receiving node and the second node may be a transmitting node. Certain steps of the routine may be performed by one or more processors of the flow control subsystem of the first node, such as any one of the example receiving nodes 120, 201, 301, 401 shown in FIGS. 1-4.

At block 510, the one or more processors of the first node may select an RTS signal received from one of a plurality of second nodes in communication with the first node. The RTs signal may indicate a size of a data communication that the second node is requesting to send to the first node. An example routine for selection of the RTS signal is described in greater detail in connection with FIG. 6.

At block 520, the one or more processors may determine whether a counter of a rate limiter at the first node is greater than 0. The counter may indicate an available bandwidth at the first node for the data communication, whereby the counter being above 0 indicates available bandwidth and the counter being at or below 0 may indicate that all available bandwidth has been reserved for data communications from other second nodes for which the first node has already transmitted back CTs signals.

If the one or more processors determine that the counter is not above 0, then operations may revert back to block 520, in which the counter is against checked. The counter may increase at a predetermined rate, such that the counter may eventually reach a value that is equal to or greater than zero after a certain amount of time. Reverting back to and repeating block 520 may occur after a delay of time (t) at block 525. The delay may be provided in order to give the counter sufficient time to increase.

Conversely, if the one or more processors determine that the counter is above 0, then operations may proceed to block 530, in which the one or more processors schedule the CTS signal to be sent to the second node. Once the CTS signal is scheduled, at block 540, the one or more processors may subtract from the counter the size of the requested data transmission associated with the RTS signal received at block 510. Over time, as more CTS signals are scheduled for transmission and more requested data transmission are cleared to be sent to the first node, the counter may decrease until a point that it is less than or equal to zero. This may occur if the pre-programmed rate of increase of the counter is slower than the rate at which the data communications associated with the received RTS signals are cleared to be sent. In such a case, the decision block 520 serves to throttle CTS generation, giving the first node an opportunity to receive some data communications before more CTS signals are returned to other second nodes.

The routine 500 of FIG. 5 may limit the overall number of CTS signals returned to nodes requesting to transmit data communications. This can limit the overall number of data communications that may be received by the first node within a given a window of time. In some examples, this limit may be capped according to a maximum value of the counter. In other words, the counter may increase at a steady rate until a maximum value, after which the counter remains fixed at the maximum value until the size of a requested data transmission is subtracted from the counter at block 540. By capping the counter, it may be ensured that the counter does not exceed a value corresponding to a bandwidth of data communications that could be serviced by the first node in the event of a burst. Stated another way, if the counter were to reach its maximum after a lull in activity but then process many RTS signals all at the same time, the total amount of data communications it would receive would still not result in congestion, even if all the communications were received in a burst or short window of time.

Figure 6:
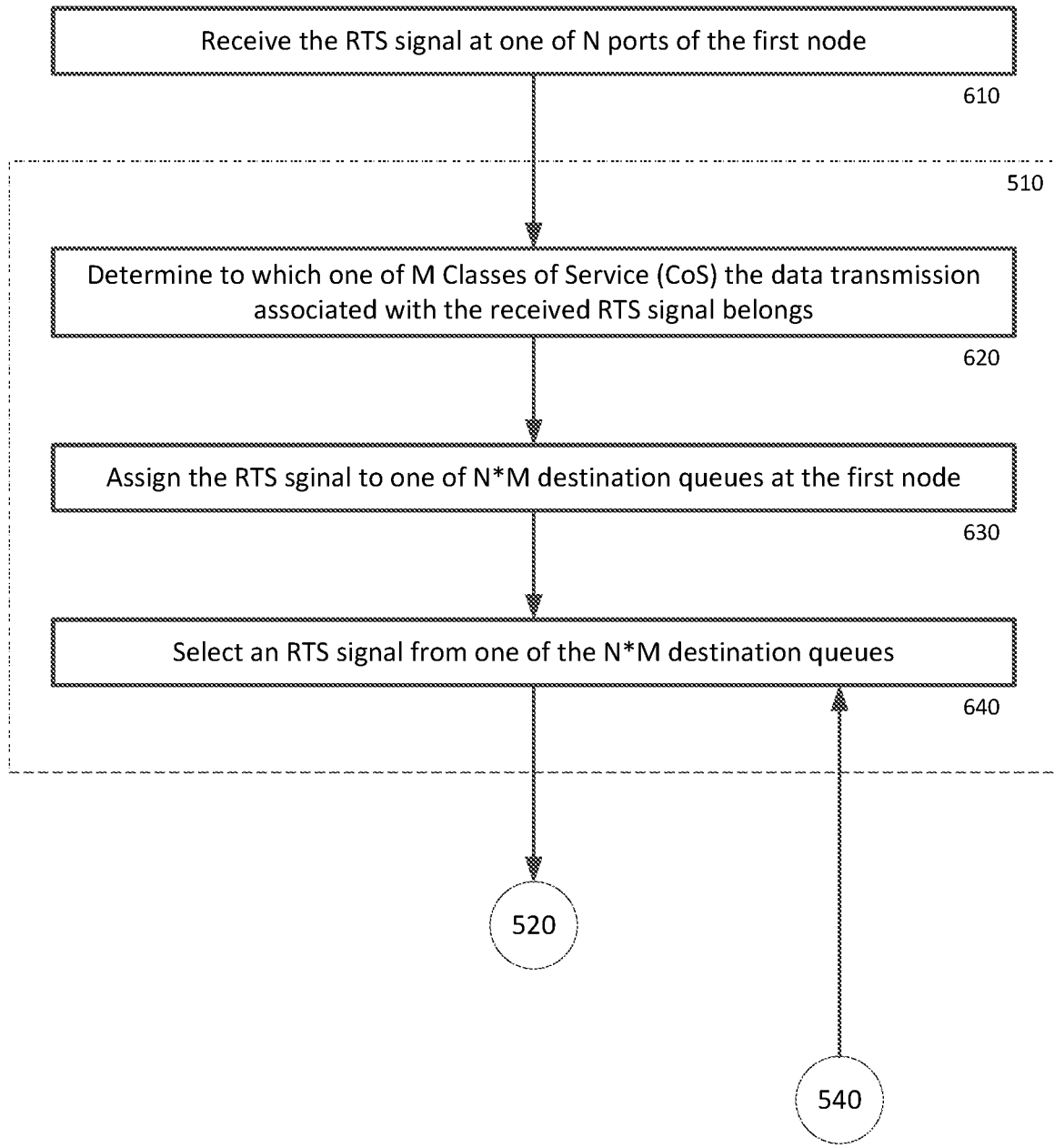
FIG. 6 is a flow diagram of an example subroutine of the routine of FIG. 5.

An example subroutine 600 for selection of the RTS signal at block 510 is described in greater detail in FIG. 6. Operations of the example subroutine 600 begin at block 610 with the first node receiving the RTS signal from a second node. The RTS signal may be received at one of N communication ports of the first node. The RTS signal may also be associated with one of M classes of service (CoS) to which the requested data transmission associated with the RTs signal may belong.

At block 620, the one or more processors may determine to which CoS the data transmission associated with the received RTS signal belongs. The CoS may be indicated within the RTS signal, such that reading at least a portion of the RTs signal can reveal the associated CoS. At block 630, the one or more processors may assign the RTS one of a plurality of destination queues at the first node. Each destination queue may be associated with a different combination of a port and a CoS, meaning that for a first node having N ports and receiving M different CoS data types, there may be M*N destination queues provided.

As RTS signals from multiple second nodes are being received at the first node, each respective RTS signal may be assigned to a certain destination queue, depending on the port at which it is received and the CoS data contained therein. At block 640, the one or more processors may select one of the received RTS signals from the plurality of destination queues. The selection may be performed using a selector, such as any one or combination of the selectors described in connection with FIGS. 2-4. Operations may then continue at block 520 of FIG. 5, with the one or more processors checking the counter to determine whether a CTS signal may be scheduled to be sent in response to the selected RTS signal.

In the example subroutine 600 of FIG. 6, the operation of block 640 may be performed after block 540 of FIG. 5, whereby scheduling a CTS signal to be returned to a second node triggers another RTs signal to be selected. In such a routine, the other operations of blocks 620 and 630 may be performed automatically by the one or more processors in response to receipt of an RTs signal from a second node at block 610. In other words, the operations of block 640 may be performed in response to completion of block 540 instead of in response to completion of 630. Nonetheless, the operations of block 640 may depend on those of block 630 having been performed at least once prior so that there is an RTs signal to be selected.

Figure 7:
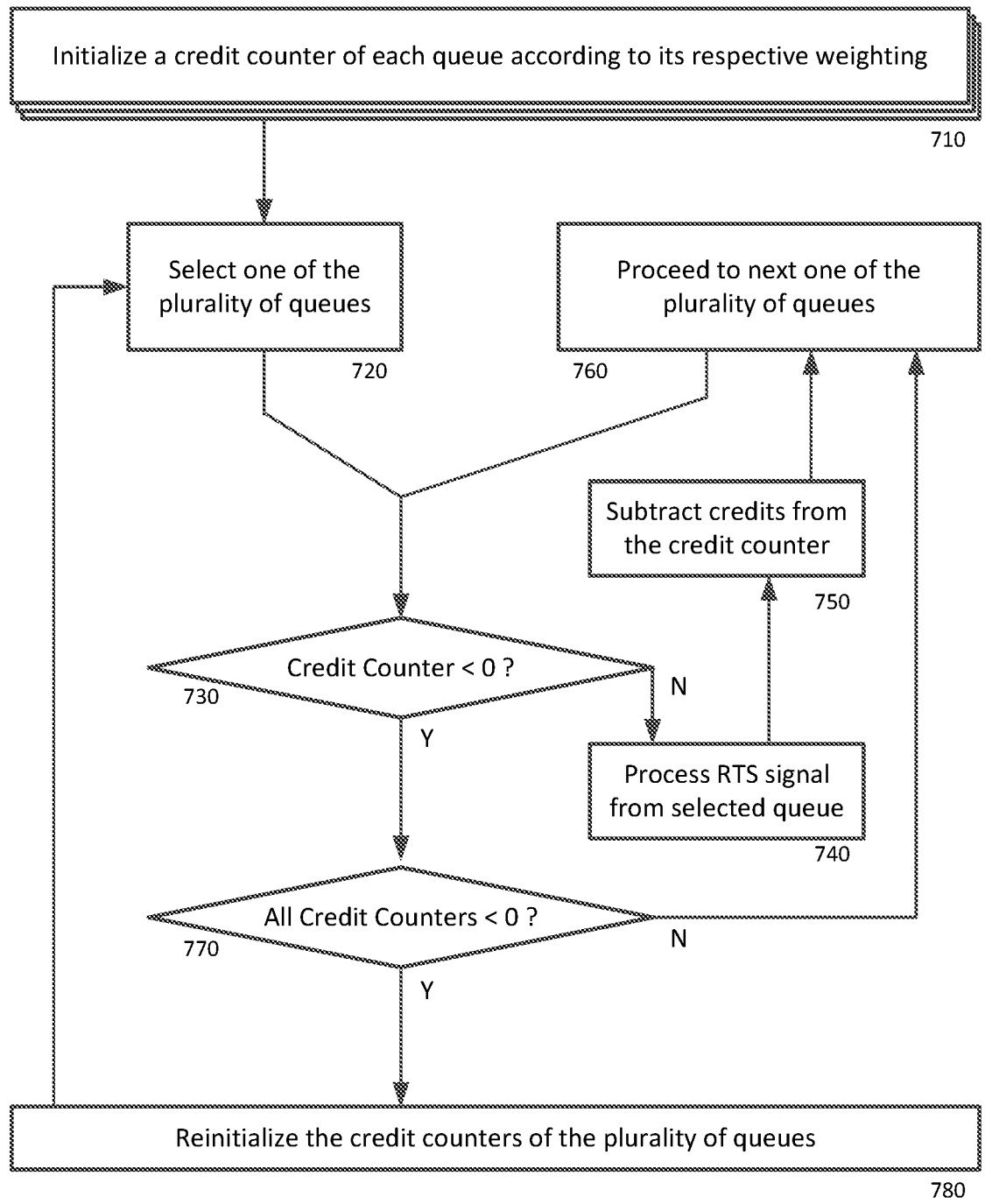
FIG. 7 is a flow diagram of an example weighted selection routine according to an aspect of the present disclosure.

FIG. 7 is a flow diagram illustrating an example routine 700 for weighted round-robin (WRR) selection by the first node from among a plurality of queues holding RTS signals from a plurality of second nodes in communication with the first node. In the example routine 700 of FIG. 7, each queue may be associated with a respective credit counter for tracking whether or not an RTS signal may be selected from the queue.

At block 710, each credit counter of the plurality of queues may be initialized by the one or more processors to a certain value. The value of each credit counter may be defined according to the queue's respective weighting. For instance, a queue having a relatively high weighting may be assigned a relatively high initial number of credits in its credit counter, whereby a queue having a relatively low weighting may be assigned a relatively low initial number of credits in its credit counter.

At block 720, the one or more processors may select one of the plurality of queues. At block 730, the one or more processors may check whether the credit counter associated with the selected queue is below zero. If the credit counter is not below zero, meaning that the queue is still eligible to be selected from, then operations may continue at block 740, at which the one or more processors may process an RTS signal from the front of the selected queue. Processing the RTS signal may involve scheduling a CTS signal to be returned to the second node from which the processed RTS signal was received. Although not shown in FIG. 7, processing the RTS signal at block 740 may be delayed according to input from a rate limiter, such as a counter that is separate from the credit counter of the selected queue.

At block 750, the one or more processors credits may subtract credits from the credit counter of the selected queue. For instance, a single credit may be subtracted in response to a single RTS signal being processed. In this regard, the number of initialized credits of a given queue may correspond to the number of RTS signals that are processed from that queue before the credit counter is reinitialized. Operations may continue at block 760, in which the one or more processors proceed with selecting the one of the plurality of queues. The order of selection of the queues, that is which queue is first at block 720 and which queue is next at block 760, may be predefined and stored in memory of the first node. Operations may then cycle back to block 730, in which the credit counter of the next queue is checked. The process of selecting a next queue at block 760, checking the credit counter of the next queue at block 730 and if the credit counter is not less than zero, processing an RTS signal from the queue at block 740 and subtracting credits from the checked credit counter at block 750 may repeat until a credit counter is found to have fewer than zero credits.

If at block 730 a credit counter is determined to have fewer than zero credits, then operations may continue at block 770, in which the one or more processors may skip processing an RTS signal from the queue of the selected credit counter. Skipping processing an RTS signal may further involve checking whether all credit counters of the first node are below zero. If at least one credit counter has not yet dropped below zero, then operations may revert to block 760, in which a next queue is selected and the credit counter is checked. Queue selection, along with RTS signal processing for queues with credits and RTS signal skipping for queues with no credits, may proceed until the credit counters of all the queues are below zero, indicating that no queues having any remaining credits.

If at block 770, no credit counters of the plurality of queues have any remaining credits, then operations may continue at block 780, in which the one or more processors reinitialize the credit counters of the plurality of queues reinitializing the credit counters may return the credits of each counter to their previous initialized values, as were set at block 710 of the routine 700. In effect, the initialized values of the counters dictate a relative number of RTS signals that may be processed for each queue until all the credits have been used up. For example, a queue associated with a port with high bandwidth may be provided with more credits than a queue associated with a port having a low bandwidth, since the high bandwidth port can support more data communications within a given span of time and thus is permitted to process more RTS signals. For further example, a queue associated with a high priority CoS may be provided with more credits than a queue associated with a low priority CoS, since it may be desired to handle more data communication of the high priority CoS data type than of the low priority CoS data type within a given span of time.

Once the counters have been reinitialized, operations may revert back to block 720, at which the one or more processors begin again cycling through the queues and processing RTS signals based on available credits in the credit counters.

The above example generally describe counter-based methods for rate limiting data flow control using RTS/CTS signaling. Rating limiting the RTS/CTS signaling allows for predictive flow control in a many-to-one endpoint scenario, so that instead of the processing of RTS signal being delayed only when the receiving node is already congested, the receiving node can predict future incast congestion based on a level of its counter and preemptively pause or slow down the processing of RTS signals. Additionally, by queuing the incoming RTS signals in parallel queues, the pausing or slowing of RTS signal processing can be performed in a manner that does not significantly interfere with high priority CoS data types, that does not unduly limit ports having relatively higher bandwidths that other receiving node ports, or both. In effect, the routines and subroutines described herein reduce congestion of data communications between nodes of a communication system by increasing congestion at the receiving node of a the RTS signals transmitted from many other transmitting nodes. Since the RTS signals are smaller than the data communications, this does not result in incast congestion at the receiving node, but rather only results in a delay to send back the CTS signal until it is expected that the receiving node has sufficient bandwidth. The reduced incast congestion can further have the effect of reducing an overall number of congestion events within the communication network, as well as reducing tail latency for the network, meaning less disruption and higher satisfaction for network users.

The examples described in the present disclosure generally describe an RTS/CTS handshake. However, it should be understood that the principles and techniques of the present disclosure could be similarly implemented with other data flow control concepts. In general, the principles and techniques of the present disclosure are applicable to an architecture in which a relatively small amount of data is initially transmitted from a plurality of source nodes to a destination node, and then a larger amount of data is transmitted to the destination node after each source node receives acknowledgement from the destination node. The small amount of data may be considered a solicitation, and the acknowledgement may be delayed in order to avoid too many source nodes sending transmission with a large amount of data within too small of a time frame for the destination node to handle.

Additionally, in the case an RTS/CTS handshake, the RTS and CTS signals are typically cells, and the subsequent data communications are packets, whereby packets contain a larger amount of data than cells. However, in other implementations, different data storing structures may be transmitted between the source and destination nodes, provided that the RTS or other handshake request signal is small than the subsequent transmission that is transmitted after receiving acknowledgement from the destination node.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, at a first node of a communications network, a request-to-send (RTS) signal from a second node of the communications network, the RTS signal indicating a size of a solicited data transmission of the second node;
determining, by the first node, whether a rate-limiting counter is above zero, wherein the rate- limiting counter is programmed to increase at a pre-programmed rate; and
in response to the rate-limiting counter being above zero:
scheduling, by the first node, a clear-to-send (CTS) signal to be sent from the first node to the second node over the communications network; and
subtracting, by the first node, a value corresponding to the size of the solicited data transmission of the second node from the rate-limiting counter.

2. The method of claim 1, further comprising:
transmitting, by the first node, the CTS signal to the second node in response to the scheduling; and
receiving, by the first node, the solicited data transmission from the second node, wherein the size of the solicited data transmission is greater than a size of the RTS signal.

3. The method of claim 1, wherein the rate limiting counter is programmed to increase at the pre-programmed rate until a predetermined maximum value.

4. The method of claim 1, further comprising:
receiving, at the first node, a request-to-send (RTS) signal from a third node of the communications network, the RTS signal indicating the size of the solicited data transmission of the third node;
determining, by the first node, whether the rate-limiting counter is above zero; and
in response to the rate-limiting counter being above zero:
scheduling, by the first node, another CTS signal to be sent from the first node to the third node over the communications network; and
subtracting, by the first node, a value corresponding to the size of the solicited data transmission of the third node from the rate-limiting counter.

5. The method of claim 4, wherein the size of the solicited data transmission of the second node is different from the size of the solicited data transmission of the third node.

6. The method of claim 1, further comprising:
determining, by the first node, at least one of (i) a port of the first node associated with the solicited data transmission, or (ii) a Class of Service (CoS) associated with the solicited data transmission;
selecting, by the first node, a destination queue for the received RTS signal from among a plurality of queues based on the determined port and CoS; and
sending, by the first node, the received RTS signal to the destination queue.

7. The method of claim 6, wherein the rate-limiting counter is associated with a selector of the first node associated with two or more of the plurality of queues including the destination queue,
wherein the method further comprises selecting, by the selector, the RTS signal from the destination queue, and
wherein scheduling the CTS signal to be sent from the first node to the second node and subtracting the value corresponding to the size of the solicited data transmission of the second node from the rate-limiting counter are in response to selection of the RTS signal from the destination queue.

8. The method of claim 7, wherein each of the two or more queues is associated with a respective weighting, the method further comprising:
initializing, by the first node, a respective credit counter of each of the two or more queues according to the respective weightings of the queues, wherein a greater weight corresponds to a larger initial credit counter value;
subtracting, by the first node, credits from the respective credit counters of the two or more queues in a round robin fashion that skips credit counters having fewer than zero credits; and
selecting the received RTS signal from the destination queue in response to credits being subtracted from the respective credit counter of the destination queue.

9. The method of claim 8, further comprising, in response to every one of the two or more queues having fewer than zero credits, reinitializing, by the first node, the respective credit counters of the two or more queues according to the respective weightings of the queues.

10. The method of claim 8, wherein for each given queue, the respective weighting of the given queue corresponds to at least one of (i) a bandwidth of the port associated with the given queue, or (ii) a priority level of the CoS associated with the given queue.

11. A system comprising:
one or more processors;
memory in communication with the one or more processors, wherein the memory contains instructions configured to cause the one or more processors to:
receive an RTS signal from a second node of the communications network, the RTS signal indicating a size of a solicited data transmission of the second node;
determine whether a rate-limiting counter is above zero, wherein the rate-limiting counter is programmed to increase at a pre-programmed rate; and
in response to the rate-limiting counter being above zero:
schedule a CTS signal to be sent from the first node to the second node over the communications network; and
subtract a value corresponding to the size of the solicited data transmission of the second node from the rate-limiting counter.

12. The system of claim 11, wherein the instructions are further configured to cause the one or more processors to:
transmit the CTS signal to the second node in response to the scheduling; and
receive the solicited data transmission from the second node, wherein the size of the solicited data transmission is greater than a size of the RTS signal.

13. The system of claim 11, wherein the rate limiting counter is programmed to increase at the pre-programmed rate until a predetermined maximum value.

14. The system of claim 11, wherein the instructions are further configured to cause the one or more processors to:
receive an RTS signal from a third node of the communications network, the RTS signal indicating the size of the solicited data transmission of the third node;
determine whether the rate-limiting counter is above zero; and
in response to the rate-limiting counter being above zero:
schedule another CTS signal to be sent from the first node to the third node over the communications network; and
subtract a value corresponding to the size of the solicited data transmission of the third node from the rate-limiting counter.

15. The system of claim 14, wherein the size of the solicited data transmission of the second node is different from the size of the solicited data transmission of the third node.

16. The system of claim 11, wherein the instructions are further configured to cause the one or more processors to:
determine at least one of (i) a port of the first node associated with the solicited data transmission, or (ii) a CoS associated with the solicited data transmission;
select a destination queue for the received RTS signal from among a plurality of queues based on the determined port and CoS; and
send the received RTS signal to the destination queue.

17. The system of claim 16, wherein the rate-limiting counter is associated with a selector of the first node associated with two or more of the plurality of queues including the destination queue, wherein the instructions are further configured to cause the one or more processors to select the RTS signal from the destination queue, and wherein the instructions are further configured to cause the one or more processors to schedule the CTS signal to be sent from the first node to the second node and subtract the value corresponding to the size of the solicited data transmission of the second node from the rate-limiting counter in response to selection of the RTS signal from the destination queue.

18. The system of claim 17, wherein each of the two or more queues is associated with a respective weighting, and the instructions are further configured to cause the one or more processors to:
initialize a respective credit counter of each of the two or more queues according to the respective weightings of the queues, wherein a greater weight corresponds to a larger initial credit counter value; and
subtract credits from the respective credit counters of the two or more queues in a round robin fashion that skips credit counters having fewer than zero credits; and
select the received RTS signal from the destination queue in response to credits being subtracted from the respective credit counter of the destination queue.

19. The system of claim 18, the instructions are further configured to cause the one or more processors to:
in response to every one of the two or more queues having fewer than zero credits, reinitialize the respective credit counters of the two or more queues according to the respective weightings of the queues.

20. The system of claim 18, wherein for each given queue, the respective weighting of the given queue corresponds to at least one of (i) a bandwidth of the port associated with the given queue, or (ii) a priority level of the CoS associated with the given queue.

* * * * *